Sept. 13, 1966   P. E. CURRY ETAL   3,272,140
METERING PUMP
Filed April 2, 1964

INVENTORS
PANAYOTIS P. DEMOPOULOS
PHILIP E. CURRY
BY *Kelly O. Corley*
ATTORNEY

United States Patent Office 3,272,140
Patented Sept. 13, 1966

3,272,140
METERING PUMP
Philip E. Curry and Panayotis P. Demopoulos, Pensacola, Fla., assignors to Monsanto Chemical Company, St. Louis, Mo., a corporation of Delaware
Filed Apr. 2, 1964, Ser. No. 356,785
4 Claims. (Cl. 103—126)

This invention relates to a positive displacement metering pump with a metered output stream which is substantially free of pulsations.

A well known prior art positive displacement metering pump is formed by driven meshing gears in a closely fitting housing. As normally constructed, such pumps produce an output stream which has substantial pulsations or variations in instantaneous flow as the individual teeth mesh. According to the present invention, such pulsations are markedly reduced and a more constant flow is achieved.

A primary object of the invention is to provide a positive displacement gear pump with a substantially constant-flow output stream. A further object is to provide for combining a plurality of pulsating output streams so phased as to substantially cancel the pulsations. A further object is to provide a pump construction incorporating the equivalent of two or more pumps, which construction may be readily employed in existing pumps with a minimum of alteration.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

Figure 1:
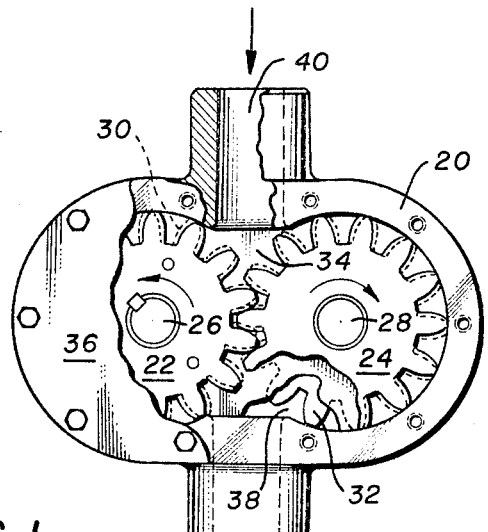
Figure 2:
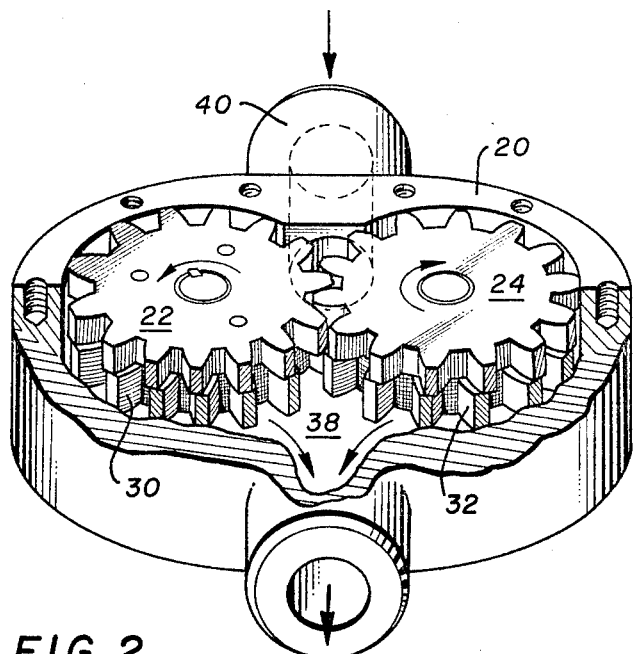

For a more complete understanding of the nature and objects of the invention, reference should be made to the following detailed description taken in connection with the accompanying drawing, in which:

FIGURE 1 is a plan view, partly broken away, of a first embodiment according to the present invention; and FIGURE 2 is a perspective view, partly broken away, of a second embodiment of the invention.

Referring now generally to FIGURE 1 there is illustrated a generally conventional metering pump housing 20. A first pair of meshed spur gears 22 and 24 are mounted within housing 20 on driven shaft 26 and idler shaft 28, respectively. A second pair of meshed spur gears 30 and 32 are similarly mounted on shafts 26 and 28, respectively, and are separated from gears 22 and 24 by separator plate 34 through which shafts 26 and 28 extend. End plates 36 and 38 close the ends of housing 20 and enclose the gears. An inlet passage 40 supplies the work liquid which is to be pumped to both sides of plate 34, and discharge passage 42 combines the pulsating output streams of the two gear pairs into a common output stream.

According to the present invention, the inherent pulsations in output flow which would be produced by either pair of meshed gears alone are substantially reduced in the common output stream by mounting the several gears on shafts 26 and 28 so that the teeth of gears 22 and 24 are angularly displaced one-fourth of the pitch with respect to the teeth on gears 30 and 32, respectively. As an example, if each gear has 30 teeth, the angle formed by lines connecting corresponding points on adjacent teeth with the gear center (the pitch angle) would be 12 degrees. In this case the gears should be mounted on the shafts so that the teeth on gear 22 are displaced three degrees with respect to the corresponding teeth of gear 30.

To illustrate the efficiency of the preesnt invention, a conventional gear pump having only a single pair of gears produces an output flow in which the variations are about 17% of the total flow. When this single pair of gears is replaced by two pairs of gears according to the present invention, the flow variations are reduced to about 4% of the total flow.

Referring now to FIGURE 2 the separator plate 34 illustrated in FIGURE 1 can be eliminated if each tooth tip extends over an arc of at least one-fourth of the pitch angle, so that each tooth overlaps the corresponding tooth on the adjacent gear on the same shaft over their entire depths, when viewed parallel to the axis about which the gears revolve. Thus in the example given above, plate 34 could be eliminated if the tips of the teeth extended over an arc on the gear circumference of at least three degrees.

Since these pumps are designed for metering or positive displacement applications, it will be understood that the several gears fit in the housing with a minimum clearance both at the gear peripheries and at the sides of the gears contacted by plates 36 and 38, and in the case of FIGURE 1, at the sides contacted by separator plate 34. In the FIGURE 2 embodiment, the gears on each shaft should abut one another as well as fitting between plates 36 and 38 with a minimum clearance.

It may be seen from the above description that the pump construction according to the present invention substantially reduce the inherent pulsations in the output flow by combining in proper phase the pulsations from a plurality of streams. The invention may readily be incorporated into existing metering pumps by replacement of the conventional single pair of meshed gears with two or more thinner pairs of meshed gears, oriented as above described. In the case wherein the gear teeth extend over an arc of at least one-fourth of the pitch angle, as illustrated in FIGURE 2, the pump housing 20 may be used without any modifications. The pump according to the present invention thus provides a substantially constant, metered output flow with very simple apparatus changes.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Pumping apparatus for producing a substantially constant flow, comprising, in combination:
    (a) a gear pump housing having an inlet port;
    (b) first and second pairs of meshed gears within said housing;
    (c) said second pair of gears being so aligned with respect to said first pair of gears that the teeth of the second pair of gears are angularly displaced one-fourth pitch with respect to the corresponding teeth on said first pair of gears;
    (d) and means defining a common discharge port for the output streams of said first and said second pairs of gears.

2. The pumping apparatus defined in claim 1 wherein the arc at the tip of each gear tooth extends for at least one-fourth of the pitch angle along the circumference of its respective gear.

3. Pumping apparatus for producing a substantially constant flow, comprising, in combination:
    (a) a housing having walls defining first and second communicating gear chambers overlapping in and joined by an intermediate common region;
    (b) a first shaft mounted for rotation along the axis of said first chamber;
    (c) first and second gears mounted on said first shaft within said first chamber so that the teeth on said first gear are angularly displaced from the teeth on said second gear by an amount equal to one-fourth of the angle between center lines of adjacent teeth;

(d) a third gear in said second chamber meshing in said common region with said first gear;

(e) a fourth gear in said second chamber meshing in said common region with said second gear;

(f) means supplying the liquid to be pumped to one side of said common region in the plane of said gears;

(g) and means for discharging said liquid at the opposite side of said common region.

4. The pumping apparatus defined in claim 3 wherein the arc at the tip of each gear tooth extends for at least one-fourth of the pitch angle along the circumference of its respective gear.

References Cited by the Examiner

UNITED STATES PATENTS

| | | | |
|---|---|---|---|
| 1,846,700 | 2/1932 | Ungar | 103—128 |
| 2,349,022 | 5/1944 | Ungar et al. | 103—126 |
| 2,362,106 | 11/1944 | Ungar et al. | 103—126 |

FOREIGN PATENTS

| | | |
|---|---|---|
| 629,654 | 5/1936 | Germany. |
| 609,108 | 9/1948 | Great Britain. |
| 751,055 | 6/1956 | Great Britain. |

MARK NEWMAN, *Primary Examiner.*

W. J. GOODLIN, *Assistant Examiner.*